Aug. 24, 1965    J. E. GOODWIN    3,202,143
PRESSURE AND TEMPERATURE RESPONSIVE ENGINE SHUT-DOWN DEVICES
Filed Sept. 24, 1963    4 Sheets-Sheet 1
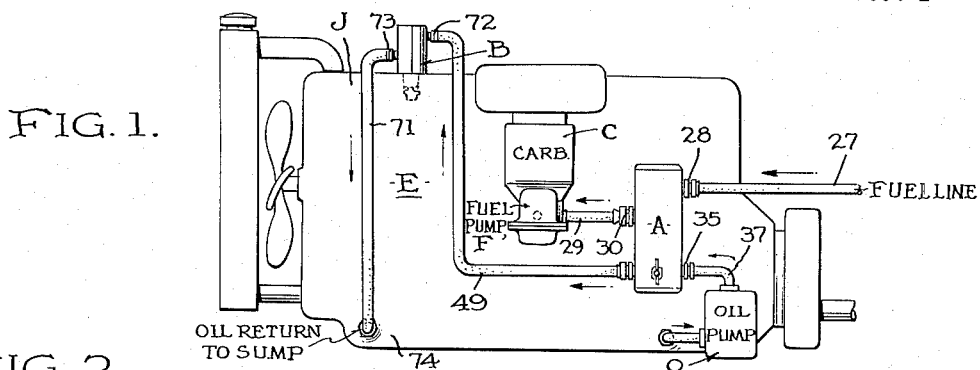
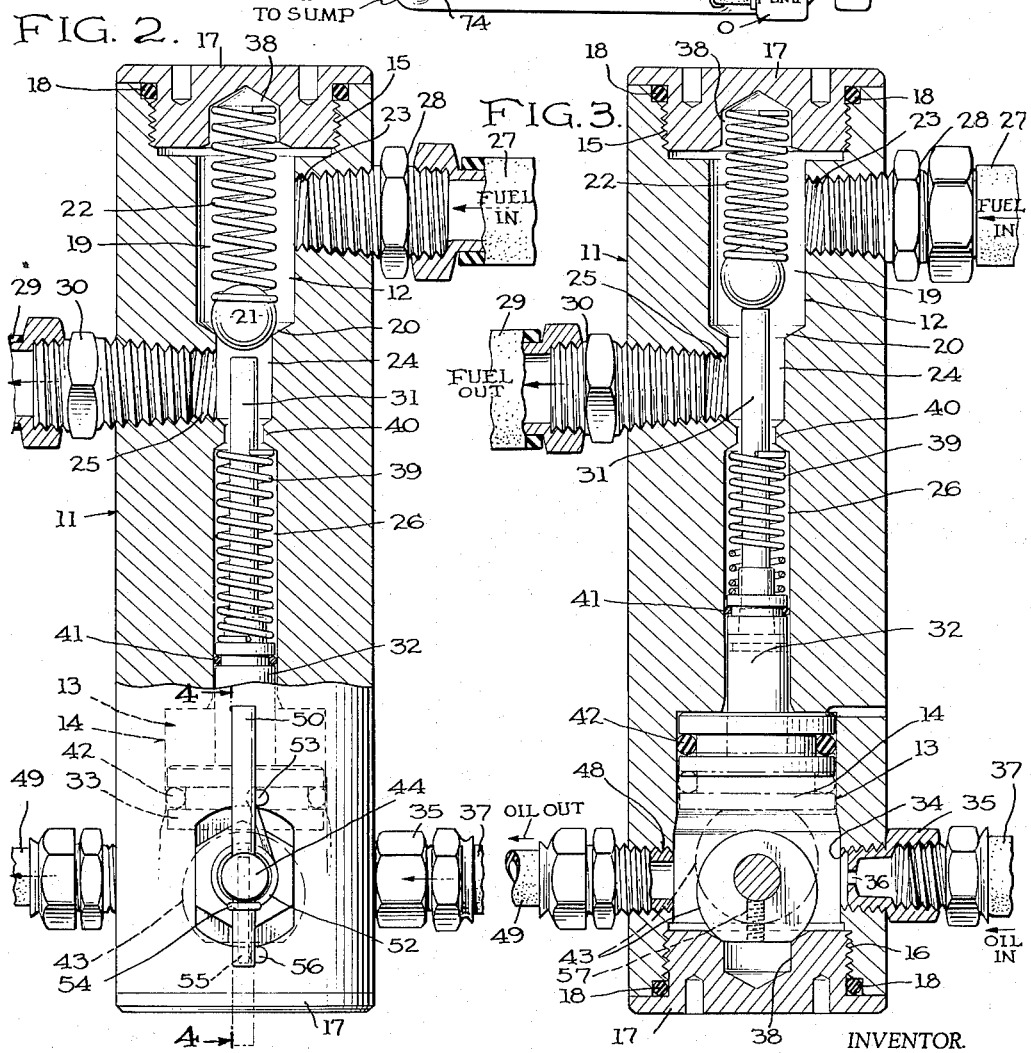
INVENTOR.
JOE E. GOODWIN
BY
Cameron, Kerkam & Sutton
ATTORNEYS Aug. 24, 1965    J. E. GOODWIN    3,202,143
PRESSURE AND TEMPERATURE RESPONSIVE ENGINE SHUT-DOWN DEVICES
Filed Sept. 24, 1963    4 Sheets-Sheet 2

INVENTOR.
JOE E. GOODWIN
BY
Cameron, Kerkam & Sutton
ATTORNEYS

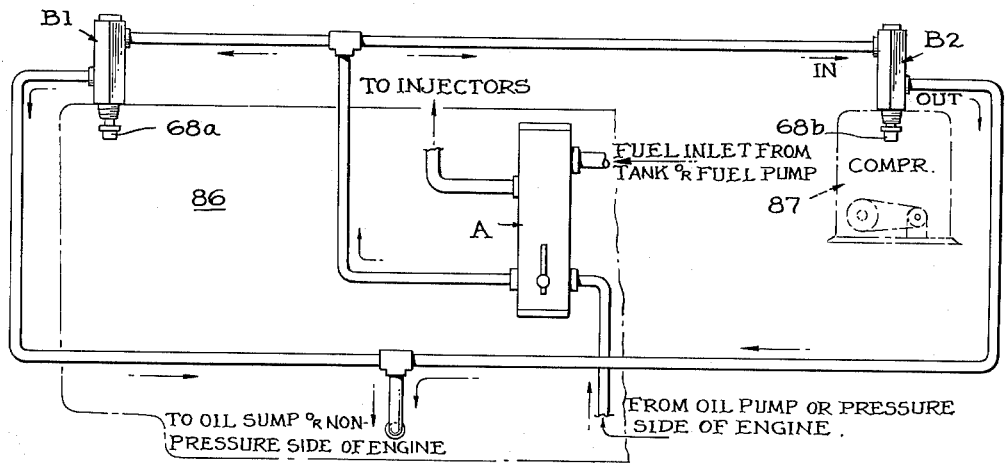
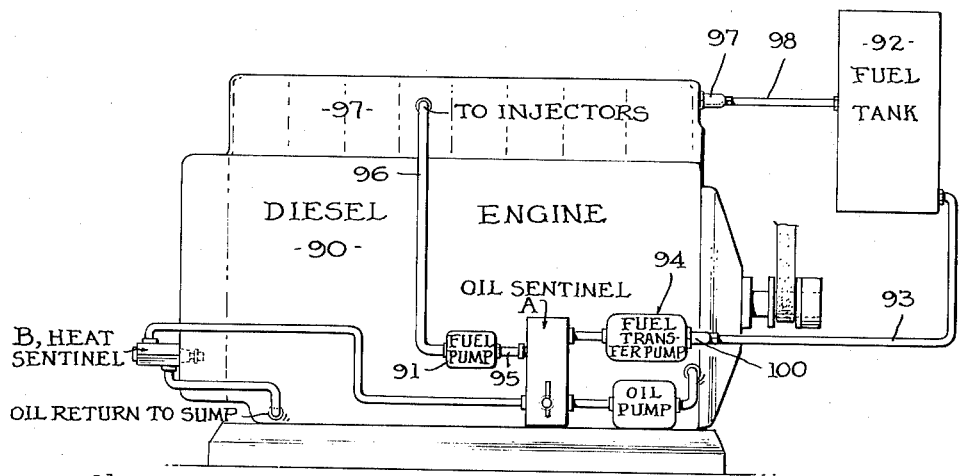
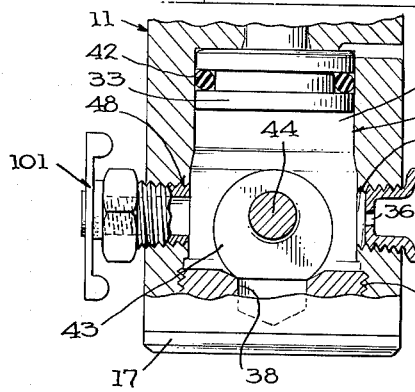

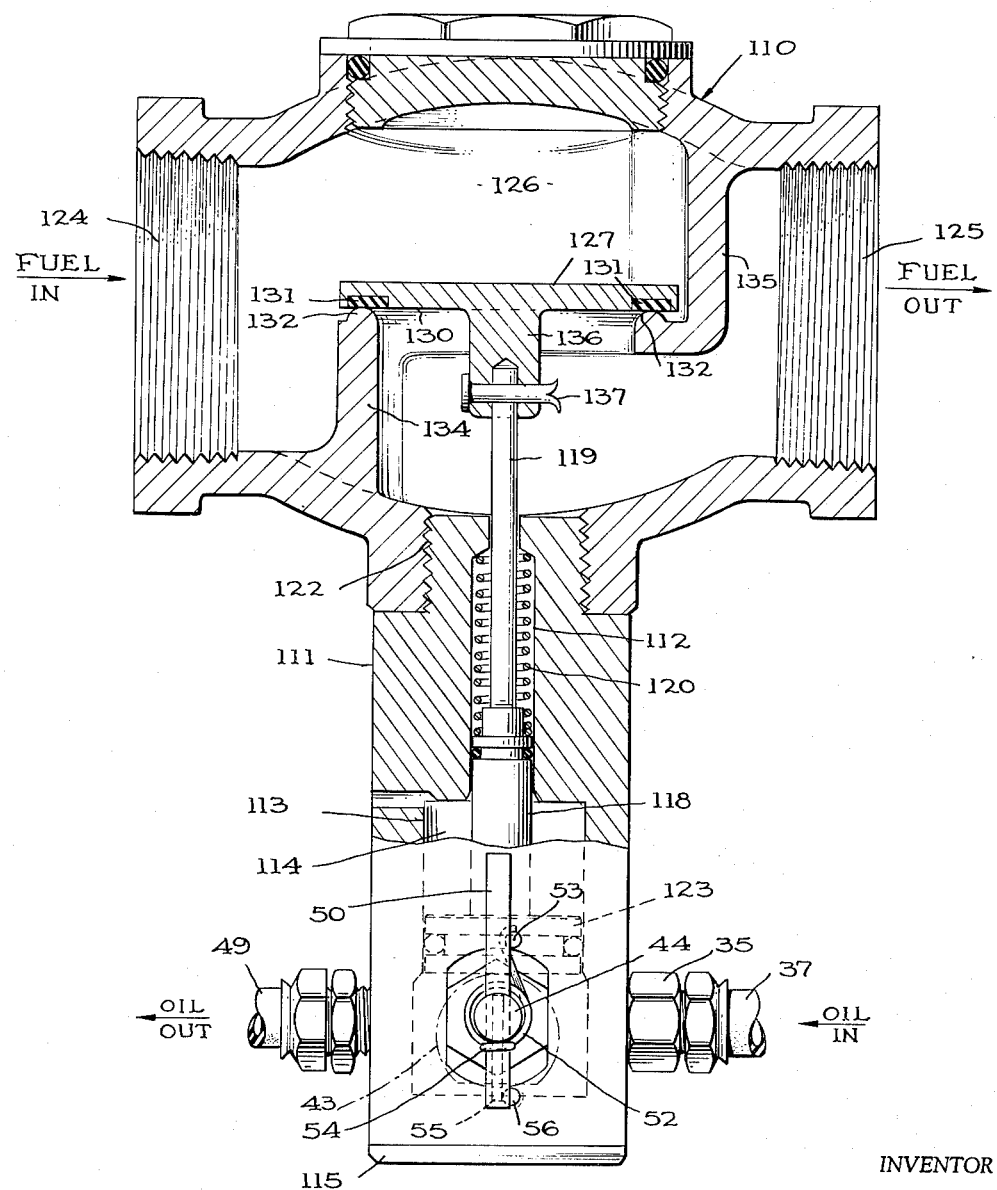

3,202,143
PRESSURE AND TEMPERATURE RESPONSIVE ENGINE SHUT-DOWN DEVICES
Joe E. Goodwin, Broomfield, Colo., assignor to Sentinel Distributors, Inc., Denver, Colo., a corporation of Delaware
Filed Sept. 24, 1963, Ser. No. 315,105
11 Claims. (Cl. 123—41.15)

This is a continuation-in-part of copending application Serial No. 265,316, filed March 13, 1963, and now abandoned.

This invention relates to safety devices for shutting down internal combustion engines in response to abnormal pressure or temperature conditions existing in the lubricating or cooling systems of such engines, and is particularly directed to protective apparatus which is adapted to cut off automatically the supply of fuel to an engine whenever the pressure of the oil lubricating either the engine or a machine driven by the engine falls below a predetermined level, or whenever the coolant temperature exceeds a preset maximum.

One of the principal objects of the invention is to provide low-cost, trouble-free devices of simple construction which are capable of effectively protecting an engine or an engine-driven accessory against damage due to insufficient oil pressure in the lubricating system thereof or to overheating, especially when such devices are used in conjunction with gasoline, gas or diesel engines of modern design wherein fuel is supplied under relatively high pressure.

Another object is the provision of a pressure-controlled fuel valve of novel construction which is operative automatically to shut off the flow of fuel therethrough whenever the oil pressure drops to any selected value, and which also may be manually operated to open the fuel line when desired even though the oil pressure is below the selected value.

A further object of the invention is to provide a self-testing, completely mechanical engine safety shut-down system which is capable of reacting positively to both excessive water jacket temperature and oil pressure failure, and wherein each element of the system contains only one principal moving part.

These and other objectives of the invention, including the provision of devices of the character described which can be quickly and easily installed on any engine or engine-driven unit such as a transmission, torque converter, compressor or the like, and which will operate reliably after initial installation without adjustment, maintenance or repairs over long periods of time, will appear more fully upon consideration of the detailed disclosure which follows. In this connection, although certain specific embodiments of the invention are described and illustrated in the accompanying drawings, it is to be expressly understood that these drawings are for purposes of illustration only and are not to be construed as defining the limits of the invention, for which latter purpose reference should be had to the appended claims.

In the drawings, wherein like reference characters indicate like parts throughout the several views:

FIG. 1 is a diagrammatic side elevational view of an internal combustion engine using gasoline as fuel and fitted with both oil pressure responsive and coolant temperature responsive engine shut-down devices in accordance with the present invention;

FIG. 2 is a front view, partially in elevation and partially in vertical cross-section, of a preferred form of oil pressure controlled, piston operated, ball type liquid fuel valve embodying the invention, the valve being shown in its seated or closed condition;

FIG. 3 is a vertical cross-sectional view of the valve of FIG. 2, with certain parts shown in full, showing the valve in fully open condition, and indicating in broken lines the positions of the movable elements when the valve is partially opened manually;

Figure 4:
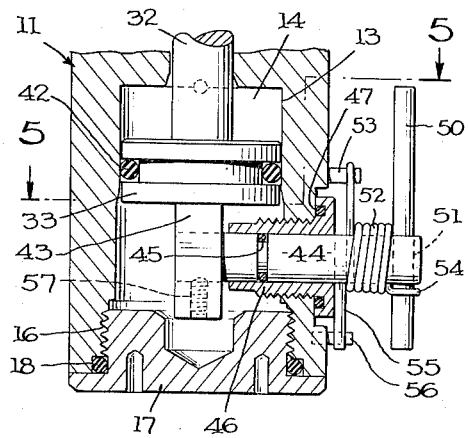
FIG. 4 is a fragmentary vertical cross-sectional view, with certain parts shown in full, of the lower portion of the valve shown in FIGS. 2 and 3, taken substantially on the line 4—4 in FIG. 2 and showing the position of the parts when the valve is opened manually.
Figure 5:
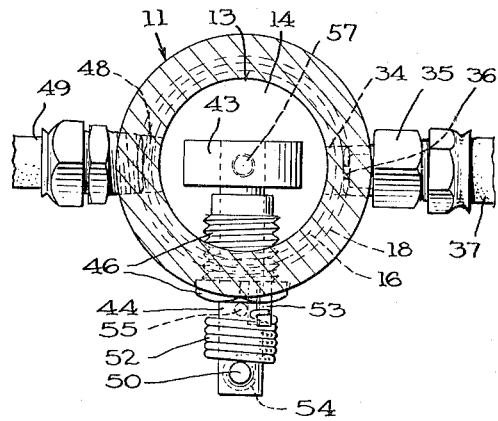
FIG. 5 is a horizontal cross-sectional view taken substantially on the line 5—5 in FIG. 4.

FIG. 8 is a diagrammatic view of an engine and an engine-driven accessory, such as a compressor, fitted with two temperature controlled safety devices in combination with an oil pressure controlled engine shut-down device according to the invention, this installation providing protection both against loss of oil pressure or overheating of the engine, and against overheating of the driven component;

FIG. 9 is a diagrammatic view of a fuel injection diesel type engine depicting the combination therewith of both pressure and temperature responsive shut-down devices embodying the invention;

FIG. 10 is a fragmentary vertical cross-sectional view, with certain parts shown in full, of the lower portion of a modified form of the fuel shut-off valve shown in FIGS. 2–5; and FIG. 11 is a front view, partially in elevation and partially in vertical cross-section, of a piston operated, globe type gas fuel valve embodying the invention, the valve being shown in its seated or closed condition.

Referring now to FIG. 1, the engine protective system there illustrated comprises both an oil pressure controlled engine shut-down device or valve A and a coolant temperature controlled shut-down device or valve B in combination with a typical internal combustion engine or prime mover E having the usual carburetor C, fuel pump F, oil pump O and cooling jacket J. For convenience, the safety devices A and B may be referred to hereinafter as the Oil Sentinel and the Heat Sentinel, respectively.

When installing these devices on a gasoline engine, it is preferable that the Oil Sentinel A be connected to the intake side of the fuel pump F, and mandatory that it be connected to the pressure side of the oil pump O, for reasons which will become apparent from the following description. The Heat Sentinel B is simply threaded into a tapped hole and connected by suitable hose lines to the oil outlet of the Oil Sentinel A and a non-pressure oil return opening in the engine block.

As shown in FIGS. 2–5, the oil pressure controlled, fuel cut-off valve or Oil Sentinel A comprises a cylindrical metallic body 11, preferably fabricated of anodized aluminum, which is of very substantial construction and is provided with an axially extending bore of varying diameter. The upper portion 12 of the bore is somewhat longer and of generally smaller diameter than the lower portion 13 which extends to the lower end of body 11 and forms a chamber 14 of relatively large cross section. The upper end of bore portion 12 opens into an enlarged counterbore which is of approximately the same diameter as chamber 14 and is provided with internal threads 15.

The lower end of chamber 14 is similarly counterbored and provided with internal threads 16 of the same diameter and pitch as threads 15 so that the two ends of body 11 may be closed by a pair of identical threaded caps 17, 17. Each cap 17 is provided with a suitable sealing element 18, such as a rubber or neoprene quad ring.

The upper portion of the bore designated generally at 12 is further sub-divided into three interconnecting shorter length chambers. The uppermost one is a combined fuel intake and fuel valve chamber 19 having at its lower end a tapered or conical valve seat 20 adapted to receive a metallic ball check valve 21 which is yieldably seated thereon by means of a compression spring 22. The ball valve 21 and associated spring 22 are preferably made of stainless steel to eliminate the adverse effect of chemical action of contaminated fuels thereon. Valve body 11 is provided adacent the upper end with a radially extending threaded fuel inlet port 23 communicating with the chamber 19. Disposed immediately below the fuel intake and valve chamber 19 is an intermediate fuel passage and fuel output chamber 24 of less diameter than chamber 19, the body 11 being provided with a radially extending threaded fuel outlet port 25 communicating with said chamber 24. Inlet and outlet ports 23 and 25 are preferably diametrically aligned in a common vertical plane, but offset horizontally as illustrated in FIGS. 2 and 3. A third chamber 26, forming the lower end of bore portion 12 and serving as a piston chamber as described hereinafter, communicates both with the lower portion of chamber 24 and with the enlarged chamber 14 at the lower end of the valve body.

The fuel intake chamber 19 is adapted to receive fuel drawn by fuel pump F from a fuel supply (not shown) through inlet port 23 and a hose or flexible pipe conduit 27 connected thereto by means of an adapter fitting 28, the fuel being delivered from chamber 24 through outlet port 25 by means of a similar conduit or hose 29 and fitting 30 to the carburetor C of the engine E with which the Oil Sentinel A is associated. The flow of fuel from the inlet port 23 to the outlet port 25, through the respective chambers 19 and 24, is controlled by the action of ball valve 21 which is adapted to be moved upwardly to open position by the end portion 31 of an operating piston 32 slidably mounted in the lowermost chamber 26 of bore portion 12 for vertical axial movement therein under the influence of opposing forces as hereinafter described. The ball valve 21 is urged downwardly into closed position on its seat 20 by spring 22 when the piston 32 is at the lower end of its stroke as shown in FIG. 2, and thereby prevents communication between chambers 19 and 24 and shuts off the flow of fuel to the engine E. The upper end portion 31 of piston 32 is of substantially less diameter than fuel passage chamber 24 so as to permit the free flow of fuel therepast, from the inlet port 23 to the outlet port 25, when the piston is moved upwardly to unseat the ball valve 21.

Connected to the lower end of piston 32 is an enlarged piston head 33 which is slidably mounted in chamber 14 formed by the lower bore portion 13. In order to raise the piston and open valve 21, the lower face of piston head 33 is exposed to the pressure of oil supplied to chamber 14 by the lubricating oil pump O (FIG. 1) through an inlet port 34 and an orifice fitting 35 having a restricted orifice 36 of substantially less diameter than the oil inlet port 34 and oil supply conduit 37. The use of the restricted orifice fitting 35 is essential in order to effect a sufficient pressure drop within the oil chamber 14 to effect closing of the valve upon operation of the Heat Sentinel B as hereinafter described.

Although the oil conduit 37 may be connected in any suitable manner to the forced feed lubricating system of the engine E with which the Oil Sentinel A is associated, it is also adapted for connection to the lubricating system of an engine-driven accessory, such as a compressor as shown in FIG. 8. In the latter event, the oil pressure supplied to chamber 14 will be the same as that existing in the latter lubricating system of the accessory.

In order to yieldably resist the upward valve-opening movement of the ball valve 21 produced by the oil pressure in chamber 14 and to automatically reclose the valve whenever the oil pressure drops below a predetermined value, the compression spring 22 is provided as aforementioned, having its lower end thrusting against the ball valve 21 and its upper end seated in a recess 38 provided in cap member 17. The force exerted on the ball valve 21 may be adjusted by using springs of different strength.

A second compression spring 39 surrounds the reduced end portion 31 of piston 32, seating at its upper end against a constricted shoulder 40 which divides chambers 24 and 26, and thrusting at its lower end against the operating piston 32, as shown in FIGS. 2 and 3. The force exerted on the operating piston 32 may also be adjusted by using springs of different strength. The compression spring 39 serves to positively move the piston 32 downwardly, permitting spring 22 to close the valve, whenever the oil pressure in chamber 14 drops below a predetermined value. Piston 32 and piston head 33 are provided with fuel-and-oil resistant quad ring seals 41 and 42, respectively.

It will be apparent from the foregoing description that the fuel valve 21 will be maintained in an elevated position, permitting a free flow of fuel from inlet port 23 through chambers 19 and 24 to outlet port 25, as long as the oil pressure in the lubricating system of the engine (or associated driven accessory) and in said chamber 14 is maintained at or above the predetermined value established by the combined force of springs 22 and 39.

The Oil Sentinel A may also have its fuel valve partially opened manually, as indicated in broken lines in FIG. 3, when the oil pressure in chamber 14 is insufficient to raise the valve to its full open position. Such manually operable means are particularly useful when this safety device is used in conjunction with an engine-compressor unit, as shown in FIG. 8, because it is frequently desirable to run the engine with the cmopressor disengaged, under which conditions the oil pressure in the lubricating system of the compressor would not hold the ball valve 21 in its open condition and the supply of fuel to the engine would be cut off.

As shown in FIGS. 2–5, the manually operable means for opening the fuel valve 21 comprises an eccentric cam 43 mounted in chamber 14 beneath the piston head 33 on the inner end of a shaft 44. The shaft 44 extends radially outwardly of the valve body 11 through a bushing 46 which is threaded into said body at a position halfway between oil inlet port 34 and a diametrically opposed oil outlet port 48, both the shaft and the bushing being provided with suitable sealing rings 45 and 47, respectively. Oil outlet port 48 communicates by means of a suitable conduit 49 with the oil inlet side of the Heat Sentinel B, described in more detail hereinafter. The cam 43 is attached to the end of shaft 44 by a setscrew 57 in a position such as to lie directly beneath the central portion of piston head 33. Cam 43 is so oriented on shaft 44 that, when the piston 32 is at the lower end of its stroke in valve-closing position, as shown in FIGS. 2 and 4, the lower face of the piston head 33 abuts the low part of the cam.

The outer end of shaft 44 is provided with an operating handle 50 which passes through a diametrically extending opening 51 in the shaft and is fixed therein in any suitable manner, as by a setscrew (not shown). Clockwise rotation of the handle and shaft through an angle of 180° rotates the cam to bring the flattened high part thereof into engagement with the piston head 33, thereby raising the piston 32 against the yieldable downward force exerted by spring 39. As is indicated by the positions of the parts shown in dotted lines in FIG. 3, it is not necessary that the throw of cam 43 be great enough to raise the piston 32 over its full stroke so as to move ball valve 21 to its full open position as long as it is sufficient to partially open the valve, because under such conditions the engine E is not fully loaded.

In order to return the cam 43 automatically to the position indicated in full lines in FIGS. 3 and 4, wherein it establishes the valve-closed position of piston 32, the cam shaft 44 is surrounded by a torsion spring 52 having one end anchored to a pin 53 which is fixed to and projects axially outwardly from valve housing 11, while the other end is hooked around the handle 50 as shown at 54. The ends of the spring 52 are so disposed and the spring is coiled in such a direction that rotation of shaft 44 in a clockwise direction tightens the spring. Consequently, after shaft 44 has been rotated by handle 50 clockwise through 180° from the position shown in FIG. 2, the spring 52 is so loaded that, as soon as the oil pressure in chamber 14 becomes high enough to raise piston head 33 out of contact with the flattened high part of cam 43, the spring 52 automatically rotates the shaft 44 in a counter-clockwise direction so as to return the cam 43 to its normal position. In this connection, it is understood that, as long as the force exerted by the spring 39 on the piston 32 exceeds that exerted on piston head 33 by the oil pressure in chamber 14, the friction between the lower face of the piston head and the high part of the cam is sufficient to prevent rotation of shaft 68 and the cam under the influence of torsion spring 52.

The rotational movement of cam 43 and shaft 44 is limited to the desired angle of 180° by means of a limit pin 55 which is fixed to and projects transversely from shaft 44. The pin 55 is so located that, when the cam 43 is in its normal position, pin 55 abuts a lower stop pin 56 which projects radially from valve body 11 in substantial vertical alignment with the spring anchor pin 53. To raise the piston by means of the cam, it is only necessary to rotate shaft 44 until limit pin 55 comes into engagement with the pin 53 which thus also serves as an upper stop pin.

Figure 6:
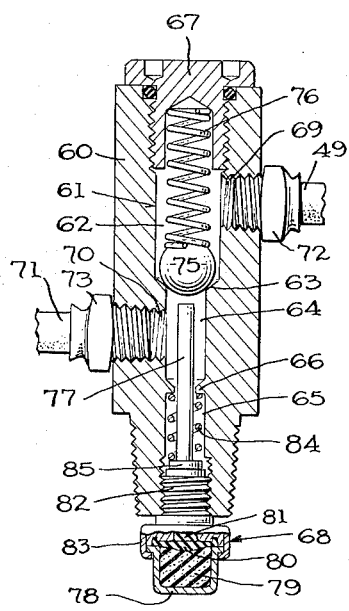
FIG. 6 is a vertical cross-sectional view, with certain parts shown in full, of a temperature responsive safety device adapted for use in combination with the fuel valve of FIGS. 2–5, as in the system illustrated in FIG. 1, said device embodying a ball type valve which is shown in its normal or closed condition.
Figure 7:
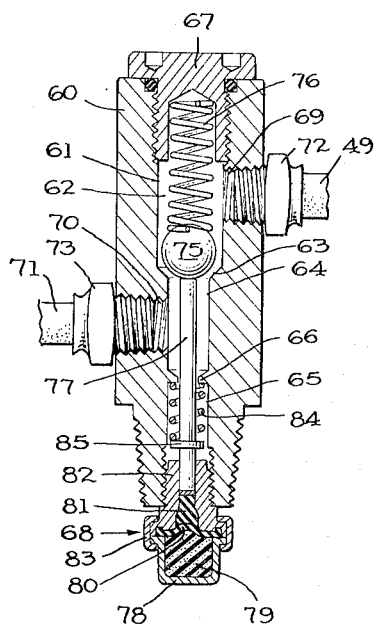
FIG. 7 is a similar vertical sectional view of the temperature responsive unit of FIG. 6, but showing the ball valve in its emergency or open condition.

Referring now to FIGS. 6 and 7, the Heat Sentinel B, which is threaded into the cooling jacket J of engine E as indicated in FIG. 1, is operable by a fusion type thermal sensing element responsive to temperature variations of the coolant medium in said jacket, and is adapted to cause a drop in the oil pressure to which the Oil Sentinel A is subject, sufficient to effect closing of the fuel valve, whenever the temperature of the coolant exceeds a predetermined value.

In the embodiment illustrated, the Heat Sentinel B comprises a valve body 60, preferably fabricated of FC or tobin brass, having an axially extending bore 61 of varying diameter defining essentially three chambers, similar to chambers 19, 24 and 26 comprising the upper bore portion 12 of valve body 11 of the Oil Sentinel A. The upper chamber of bore 61 is an oil intake and valve chamber 62, having a tapered or conical ball seat 63 and communicating with an intermediate oil passageway or chamber 64 below which is a piston chamber 65, the latter being separated from chamber 64 by a constricted shoulder or collar 66. The upper end of bore 61 of valve body 60 is closed by a threaded cap 67, generally similar to cap 17 of Oil Sentinel A, while the lower end of said bore is closed by a fusion type thermal sensing or expansion element designated generally at 68 which is threaded into the bottom of body 60. The lower portion of body 60 is also externally threaded so that it may be screwed into a suitable tapped opening in the cooling jacket of the engine. Valve body 60 is further provided with a radially extending threaded oil inlet port 69 which communicates directly with chamber 62, and with a threaded outlet port 70 leading from chamber 64 which is disposed in substantially the same vertical plane as port 69 but horizontally offset therefrom, as shown in FIGS. 6 and 7. Radially extending oil supply and return conduits 49 and 71 are connected to ports 69 and 70 by complementally threaded inlet and outlet fittings 72 and 73, respectively, line 49 leading from the oil outlet port 48 of the Oil Sentinel A while line 71 is adapted to serve as an oil return line connecting outlet port 70 of the Heat Sentinel with the oil sump 74 on the non-pressure side of the engine block (FIG. 1).

A ball check valve 75, which controls the flow of oil from the Oil Sentinel A through the Heat Sentinel B, is normally maintained in closed position on the seat 63 by a compression spring 76 the upper end of which thrusts against the cap 67. Upward or opening movement of the ball valve 75 is effected by an elongated piston or push rod 77 which is actuated by the thermal sensing element 68 and extends upwardly through the collar 66 by which it is slidably guided when movement takes place.

The thermal sensing unit 68 may be of any commercially available type, such as the Vernatherm power element manufactured by American Radiator & Standard Sanitary Corporation, of Detroit, Michigan. Such a unit may comprise an annularly flanged cup-shaped metallic body 78 containing a fusion type charge 79 which expands and contracts in response to temperature changes, and thereby actuates a flexible diaphragm 80. The diaphragm 80 in turn actuates a resilient plug member 81 which is housed within a flanged cylindrical metal guide 82 externally threaded at its upper end for engagement with the lower end of body 60. The flange portion of guide 82 is adapted to compress and hold the periphery of the diaphragm 80 onto the flanged area of the cup-shaped body 78 and is retained in assembly therewith by an annular retainer ring 83, as best shown in FIG. 7. The lower end of piston 77 is adapted to be slidably seated within the axial bore of the guide 82 atop the expansible plug member 81, the piston being provided with a collar 85 which normally engages the upper end of guide 82 and preferably has a relatively close sliding fit within chamber 65 in order to further stabilize the movement of the piston. Inasmuch as the charge 79 is normally effective only to cause an upward movement of the plug 81 and piston 77 upon expansion of the charge due to an increase in temperature, a return spring 84 is interposed between shoulder 66 and collar 85 to move the piston 77 downwardly upon subsequent contraction of the charge 79.

The charge 79 may comprise a powdered copper and wax composition, and is selected in accordance with the range of temperatures to which the thermal element 68 is to be subjected. The length of piston 77 is then determined so that the ball valve will be opened when the charge is subjected to a specific temperature within that range. The Heat Sentinel body 60 is preferably made of brass when utilizing a brass Vernatherm unit in order to eliminate any potential electrolytic action therebetween. It is also preferred to use a tobin brass material for the body 60 in order to keep the corrosion factor to a minimum in marine applications.

When the Heat Sentinel B is mounted on an engine as illustrated in FIG. 1, with the thermal unit 68 exposed to the temperature of the coolant medium, it will be apparent that, when that temperature rises to a predetermined value, established by the expansion characteristics of charge 79 and the length of piston 77, expansion of the thermal charge will move the piston upwardly and effect opening of the spring-loaded ball valve 75, allowing oil to flow from the Oil Sentinel A through the Heat Sentinel B and back into the non-pressurized oil sump 74 of the engine block. Due to the presence of the restricted orifice fitting 35 in the oil inlet port 34 of the Oil Sentinel A, opening of the Heat Sentinel valve causes an immediate and substantial drop in the pressure of the oil in chamber 14 of the Oil Sentinel which in turn results in closure of the spring-loaded ball check valve 21 and cutting off of the flow of fuel to the engine E, as previously described.

The following data are illustrative of the relative sizes and other characteristics of the Oil Sentinel A and Heat Sentinel B, and their associated fuel and oil conduits and fittings.

The Oil Sentinel A, which can be readily installed by the average mechanic in 30–45 minutes in any desired position, is a compact 7″ long by 2″ in diameter, having a weight of approximately 2½ pounds, and requires a total movement of the valve opening piston of only ⅜″. The fuel inlet and outlet conduits are preferably ⅜″ lines, while the hose delivering oil to the Oil Sentinel from the pressure side of the engine block or oil pump is a ⅛″ line. In such an installation, it is mandatory that the oil inlet port be provided with a ⅛″ orifice fitting wherein the orifice opening is within the range from .055″ to .080″, and preferably from .062″ to .072″, in order to effectively cause a shut-down of the engine when overheating as detected by the Heat Sentinel B. The oil outlet port fitting of the Oil Sentinel and the line connecting the Oil Sentinel and the Heat Sentinel should have an unrestricted ¼″ inside diameter to assure a sufficient pressure drop in the Oil Sentinel to effect prompt closing of the fuel supply valve. A ¼″ line is also preferably used to connect the oil outlet port of the Heat Sentinel to the non-pressure side or oil sump of the engine block.

The Heat Sentinel B, by comparison, is only 4½″ long and 1¼″ in diameter, and weighs only about ½ pound. The amount of travel of the piston or push rod of the Heat Sentinel is determined by the length thereof, or the amount of clearance between the upper end of the piston and the ball valve when the thermal element is unheated, which is in turn dependent upon the temperature at which the Heat Sentinel is intended to operate. For example, in a 225° F. Sentinel it is desirable to use a Vernatherm unit which produces a longitudinal movement of from .100″ to 120″ between 215° and 235° F., in combination with a piston having a length of approximately 1.205″ between its collar and its upper end and a clearance of .015″ between its upper end and the ball valve at normal temperature. When the Heat Sentinel operates the restricted orifice fitting at the oil inlet port of the Oil Sentinel causes an immediate pressure drop of 35 p.s.i. when the oil is supplied at a pressure of 40 p.s.i. Oil pressures normally encountered range from 15 p.s.i. during engine idling up to 40 p.s.i. at governed full throttle. Effective fuel shut-off can be obtained at 10 p.s.i. of oil pressure in the Oil Sentinel. Any unusual engine oil pump volumes or pressures can be coped with by utilizing orifices of appropriate size. After actuation and shut down, the Heat Sentinel is automatically reset and ready for "on guard" action again within a relatively short period of about 30 seconds.

Referring now to FIG. 8, there is illustrated schematically therein an installation of two Heat Sentinels B1 and B2 connected in parallel with a single Oil Sentinel A. As shown, Heat Sentinel B1 is so mounted as to sense the temperature of the coolant of a prime mover or engine 86 to which the Oil Sentinel A is also connected, as in the example of FIG. 1, while Heat Sentinel B2 is associated with the cooling system of an accessory 87 driven by the engine 86, such as a rotary compressor, transmission, torque convertor or the like, wherein excessive heat may be generated. This installation provides engine shut-down protection responsive to either (a) loss of oil pressure in the prime mover 86, (b) overheating of said prime mover, or (c) overheating of a driven accessory, such as the compressor 87. The thermal unit 68a of Heat Sentinel B1 may be of different calibration than the unit 68b of Heat Sentinel B2, depending upon the temperature ranges which are considered excessive for the respective components. For example, a 200° or 212° F. unit might suffice for Heat Sentinel B1, while a 225° or 55° F. unit might be required for Heat Sentinel B2.

In order to determine whether an Oil Sentinel should be installed on the pressure or the non-pressure side of a fuel pump or fuel transfer pump, the fuel pressure at full throttle and idle r.p.m. should be considered. However, an Oil Sentinel should never be installed on the pressure side of a fuel injection pump such as is used in connection with diesel engines. The exemplary fuel pressure-oil pressure chart set forth below will indicate how the location of the Oil Sentinel may be determined.

*Fuel pressure-oil pressure chart for diesel and gasoline engines*

| Fuel pressure, p.s.i.: | Oil pressure at oil sentinel fuel shut-off, p.s.i. |
|---|---|
| 150 | 30 |
| 100 | 25 |
| 90 | 24 |
| 80 | 23 |
| 70 | 21 |
| 60 | 19 |
| 40 | 16 |
| 30 | 15 |
| 20 | 13 |
| 10 | 12 |
| 0 | 10 |

As an example, let it be assumed that, at idle r.p.m., an engine has 20 p.s.i. fuel pressure and 15 p.s.i. oil pressure. By checking the above chart, it will be seen that, at 20 p.s.i. fuel pressure, the Oil Sentinel will shut off the fuel supply to the engine at 13 p.s.i. of oil pressure. Consequently, it would be permissible in this case to install the Oil Sentinel on the pressure side of the fuel or fuel transfer pump. If the same engine has 60 p.s.i. fuel pressure at full throttle, then the Oil Sentinel will shut-off the fuel supply to the engine at 19 p.s.i. of oil pressure. However, if the idling fuel pressure is 20 p.s.i. and the idling oil pressure is less than 13 p.s.i. but greater than 10 p.s.i., it will be necessary to install the Oil Sentinel on the suction or intake side of the fuel or fuel transfer pump.

FIG. 9 is a schematic showing of a safety shut-down system comprising an Oil Sentinel A and a Heat Sentinel B in association with a diesel engine 90, wherein the Oil Sentinel is mounted on the intake side of the fuel injection pump 91. Fuel is supplied from tank 92 through conduit 93 and fuel transfer pump 94 to the intake side of Oil Sentinel A and thence by line 95 to the suction side of the injection pump 91. Line 96 directs the supply of fuel to the injectors designated generally at 97. A fuel return line 98, which includes a ball check valve 99, leads back to the fuel supply tank 92. Another check valve 100 may be provided in the line 93 between tank 92 and transfer pump 94. The oil lines leading from the pressure side of the oil pump into and out of the Oil Sentinel A, into and out of the Heat Sentinel B and back to the sump of the engine are of the same general arrangement as described in connection with the installation of FIG. 1.

In each of the embodiments of the invention described above, the system includes one or more Heat Sentinels in combination with an Oil Sentinel so as to protect an engine or an engine-driven accessory from both insufficient oil pressure in the lubricating system and overheating. However, in instances where overheating is not a problem, an Oil Sentinel may be used alone, in which event the only change necessary in its construction is a replacement of the oil outlet line fitting by either a plug or a normally closed petcock.

As shown in FIG. 10, wherein only the lower part of the Oil Sentinel is illustrated since the remainder of the construction is identical with that of FIGS. 2–5, the oil outlet port 48 of chamber 14 is provided with a petcock 101 which is normally closed so that the pressure of the oil in chamber 14 is the same as that in the lubricating system of the engine. Consequently, in the event of a failure of the oil pump, or if for any other reason the oil pressure drops below a predetermined level, there will be an immediate drop in pressure in chamber 14 and the spring 39 (FIGS. 2–3) will move the piston 32 downwardly until piston head 33 abuts the low part of cam 43, thereby enabling spring 22 to close the fuel valve 21 and cut off the flow of fuel to the engine.

One advantage of fitting the oil outlet port 48 with the petcock 101 instead of a simple plug is that it enables testing of the Oil Sentinel at any time the engine is running to make sure that the fuel valve will close automatically when the oil pressure drops below a safe level. That is, when the engine is running normally, opening of petcock 101 will immediately reduce the oil pressure in chamber 14 by allowing some of the oil to escape, and, if the device is working properly, will result in downward movement of the piston and closure of the fuel valve. If, however, opening of petcock 101 does not result in stoppage of the engine, the operator will know that the device is not functioning properly and can rectify whatever defect exists before any damage occurs. Closure of the petcock after a successful test restores the Oil Sentinel to operative condition ready for restarting of the engine, either in the normal manner or, in the event that an excessive amount of oil has escaped from chamber 14 through the petcock, by manually raising piston 32 and opening valve 21 by means of cam 43, as previously described. Petcock 101 may also serve as a means for permitting air to escape from chamber 14 when the Oil Sentinel is initially installed and the chamber is being filled with oil by connection to the lubricating system of the engine, or whenever the lubricating system is drained and refilled with fresh oil.

Referring now to FIG. 11, there is illustrated therein another form of Oil Sentinel, adapted for use with gas-butane engines, embodying a globe type gas fuel valve which will accommodate all manufactured and natural gases with flow pressures ranging from 2 ounces to 50 p.s.i., and which will, upon loss of engine oil pressure and/or overheating in the engine or in accessory equipment, positively shut off the flow of fuel to the engine. Only the upper part of the Oil Sentinel is illustrated in cross-section in FIG. 11 since the remainder of the construction, including the oil inlet and outlet ports, orifice fitting, pressure chamber, piston, piston head and manual actuating means, is identical with that of FIGS. 2–5.

As shown in FIG. 11, the Oil Sentinel comprises a cylindrical metallic body 111, preferably fabricated of anodized aluminum, having an axially extending bore of varying diameter. The upper portion 112 of the bore is somewhat longer and of generally smaller diameter than the lower portion 113 which extends to the lower end of body 111 and forms a chamber 114 of relatively large cross section. The lower end of chamber 114 is counterbored and provided with internal threads so that the body 111 may be closed at its lower end by a threaded cap 115, provided with a suitable sealing element, such as the rubber or neoprene quad ring 18 of FIG. 3.

Slidably mounted within chamber 114 is an operating piston 118 having an extending shaft or end portion 119 which is arranged for axial movement under the influence of opposing forces of compression spring 120 and the oil pressure exerted on the piston head 123 of operating piston 118 through oil inlet orifice fitting 35. It should be readily apparent that the construction and operation of the elements comprising the lower portion of body 111 of the Oil Sentinel of FIG. 11 are identical to those of the lower portion of the Oil Sentinel illustrated in FIGS. 2–5, hereinbefore described.

The upper portion of body 111 is modified to accommodate the body 110 of a globe type gas valve having fuel inlet and outlet ports 124 and 125, respectively, and a valve 127 which is capable of positively shutting off the fuel supply of a gas-butane engine. To this end, the upper portion of body 111 is machined and threaded, as at 122, so as to engage the mating threads of body 110, and the latter. A fuel passageway 126, located between inlet port 124 and outlet port 125, is adapted to receive fuel from a suitable fuel supply (not shown) through the inlet port 124 and a suitable adapter fitting and pipe conduit (not shown). The fuel delivered to fuel passageway 126 is translated, when valve 127 is open, through outlet port 125 and a suitable adapter fitting and pipe conduit (not shown) to the engine with which the Oil Sentinel is associated.

The flow of fuel from inlet port 124 through passageway 126 to outlet port 125 is controlled by the action of a disc valve 127 which comprises a disc 130 having an annular sealing insert 131 made of a high oil-, acid- and hydrocarbon-resistant material, such as Hycar. Disc 130 is arranged to seat upon a precision machined, annular seat or extension 132 which projects from oppositely extending valve seat supports 134 and 135 which are in the form of arcuate walls cast integrally with the valve body 110. Valve 127 is adapted to be moved upwardly to its open position by the end portion 119 of piston 118 to which it is pivotally secured by a downwardly extending clevis 136 and pin 137. The disc valve 127 is pulled downwardly into its closed position on seat 132 by end portion 119 of operating piston 118 when the latter is forced down to the lower end of its stroke by spring 120 upon a drop in oil pressure beneath piston head 123, whereupon the valve prevents communication between inlet port 124 and outlet port 125 and shuts off the flow of fuel to the engine.

It will be apparent from the foregoing description that the operating principle of the Oil Sentinel of FIG. 11 is similar to that of FIGS. 2–5, except that the disc valve 127 is specially designed to provide a positive shut-off of the fuel supply to gas-butane engines. The valve accommodates all manufactured and natural gases with flow pressures from 2 ounces to 50 p.s.i., and will, upon loss of engine oil pressure and/or overheating, positively shut off the flow of fuel to the engine in the manner hereinbefore described. The flow of fuel through the passageway within the globe type valve body is directed smoothly, and the pressure drop through the valve is negligible. When the valve is closed, the fuel pressure acting against the top surface of the disc 130 assists in maintaining the insert 131 tightly against the seat 132 to more efficiently effect the fuel shut-off.

The Oil Sentinel illustrated in FIG. 11 is structurally designed for rapid installation and easy access to all parts subject to wear, and for operation at all pressures and temperatures normally encountered in service on gas-butane engines without excessive weight. In the preferred embodiment, the upper globe type valve body 110 is constructed from Apex 417 aluminum, sand casted, and is pressure tight, free of gas and air pockets, and highly resistant to corrosion. The valve disc 130 is made of No. 115 ounce metal, sand casted, pressure tight, and free of air and gas pockets, and contains a sealing ring or disc 131 made from Hycar having a Shore durometer hardness of 100 which provides a seal thaat is highly resistant to the adverse effects of oil, acid and hydrocarbons. The valve body 110 and the cylindrical body member 111 may be anodized to give even greater corrosion resistance.

There is thus provided by the present invention new, improved and simplified valve mechanisms for automatically controlling the flow of either liquid or gaseous fuel to an internal combustion engine in response to both the pressure conditions existing in the lubricating system and the temperature conditions existing in the cooling system of either the engine itself or a machine driven by the engine. The improved mechanisms are of low-cost and simple but durable construction having the characteristic of being like a solid bar and not effected by vibration. Because they embody only one principal moving part, they are capable of reliable trouble-free operation over long periods of time without requiring maintenance, adjustments or repairs. These safety devices can be readily installed on any engine or engine-and-accessory unit, including engines having high pressure fuel supply systems, and will positively protect the engine or the engine-driven accessory against damage due to either faulty lubrication or overheating. In this connection, it will be obvious that both the engine and the accessory may be protected against lubrication failure by utilizing two Oil Sentinels valves of the invention, connected in series into the fuel line of the engine, one being controlled by the oil pressure of the engine while the other is controlled by the oil pressure of the accessory.

A particularly favorable characteristic feature of both types of valves is that they have only one principal moving part, and that the movement of that part is relatively small, being only about 3/8" in the normal Oil Sentinel installation and only a few hundredths of an inch in the Heat Sentinel. Other features include the provision of means for manually opening the Oil Sentinel valve whenever necessary or desirable, and the ability to self-test the operation of the system while the engine is running. Another advantage resides in the fact that there is a negligible fuel pressure drop across the valve of the Oil Sentinel, i.e., a drop of only about 0.5 p.s.i. at a flow rate of 2.5 gallons per minute. The fuel shut-off action and subsequent effect on the fuel flow system prohibits the starving of injectors in diesel engines. The Oil and Heat Sentinels of this invention are also well adapted for use in complete automation programs. The Oil Sentinel operates as a built-in check valve in the fuel system to allow the system to remain primed at all times on normal shut-down. For automated systems with stop-and-start usage, no draining of the fuel system will take place, as the ball check valve locks the fuel in the system. Likewise, the oil system will remain loaded, and one or two turns of the oil pump will kick the piston and ball valve open for instant starting. Both the Oil Sentinel and the Heat Sentinel may be used wtih either new or existing alarm systems to give pre-shut-down warnings.

Although certain specific forms of valve mechanisms have been described and illustrated in the accompanying drawings, it will be obvious that the invention is not limited to the particular devices shown, but are capable of a variety of mechanical embodiments. Various changes which will now suggest themselves to those skilled in the art may be made in the form, details of construction and arrangement of the parts of the respective devices without departing from the inventive concept. Reference is therefore to be had to the appended claims for a definition of the limits of the invention.

What is claimed is:

1. Apparatus for controlling the flow of fuel to an internal combustion engine in response to pressure and temperature conditions existing in a pressure lubricating system and a cooling system associated with the engine, comprising a valve in the fuel supply line of the engine, pressure actuated means normally subject to a pressure equal to that of the lubricant in said lubricating system for maintaining said valve in open position as long as the pressure exerted on said means is at least equal to a predetermined value, means operable to close said valve when the pressure exerted on said pressure actuated means drops below said predetermined value, and means responsive to the temperature of the coolant in said cooling system for reducing the pressure exerted on said pressure actuated means below said predetermined value when said temperature rises above a predetermined temperature, even though the pressure of the lubricant in said lubricating system remains at least equal to said predetermined value.

2. Apparatus as claimed in claim 1 wherein said pressure actuated means and said temperature responsive means are subject, respectively, to the pressure of the lubricant in the lubricating system and the temperature of the coolant in the cooling system of the engine to which the flow of fuel is controlled by said valve.

3. Apparatus as claimed in claim 1 wherein said pressure actuated means and said temperature responsive means are subject, respectively, to the pressure of the lubricant in the lubricating system and the temperature of the coolant in the cooling system of an accessory driven by the engine to which the flow of fuel is controlled by said valve.

4. Apparatus as claimed in claim 1 wherein said pressure actuated means is subject to the pressure of the lubricant in the lubricating system of the engine to which the flow of fuel is controlled by said valve, and the temperature responsive means is subject to the temperature of the coolant in the cooling system of an accessory driven by said engine.

5. Apparatus as claimed in claim 2 including a second temperature responsive means which is subject to the temperature of the coolant in the cooling system of an accessory driven by said engine, each of said temperature responsive means being operative individually to reduce the pressure exerted on said pressure actuated means.

6. Apparatus for controlling the flow of fuel to an internal combustion engine in response to pressure and temperature conditions existing in a pressure lubricating system and a cooling system associated with the engine, comprising a valve in the fuel supply line of the engine, pressure actuated means including a piston movable in a chamber to which lubricant is supplied under pressure from the lubricating system for maintaining said valve in open position as long as the pressure exerted on said piston by the lubricant in said chamber is at least equal to a predetermined value, means operable to close said valve when the pressure exerted on said piston drops below said predetermined value, and means responsive to the temperature of the coolant in said cooling system for reducing the pressure exerted on said piston below said predetermined value when said temperature rises above a predetermined temperature, even though the pressure of the lubricant in said lubricating system remains at least equal to said predetermined value, said temperature responsive means including a passageway through which the lubricant may flow from said chamber back to a nonpressurized portion of the lubricating system, a normally closed valve in said passageway, and a thermal responsive element subject to the temperature of said coolant operative to open said valve when the temperature of said coolant rises above said predetermined temperature.

7. Apparatus as claimed in claim 6 including manually operable means for moving said piston to open said valve when the pressure exerted on said piston by the lubricant in said chamber is less than said predetermined value.

8. Apparatus for controlling the flow of fuel to an internal combustion engine in response to pressure and temperature conditions existing in a pressure lubricating system and a cooling system associated with the engine, comprising:
 (1) a pressure actuated device including
  (a) a body having a fuel passageway therein,
  (b) fuel inlet and outlet ports communicating with said passageway and connected to the fuel supply line of the engine,
  (c) a fuel valve in said passageway controlling the flow of fuel between said inlet and outlet ports,
  (d) a piston movably mounted in a chamber in said body,
  (e) means including a lubricant inlet port in said body for delivering lubricant to said chamber from the pressure side of the lubricating system,
  (f) said piston having a portion adapted to engage and open said valve when said piston is moved in one direction by the pressure of the lubricant in said chamber, and
  (g) yieldable means for moving said piston in the opposite direction so as to permit the valve to close when the pressure of the lubricant in said chamber drops below a predetermined value,
 (2) a temperature responsive device including
  (h) a body having a lubricant passageway therein,
  (i) lubricant inlet and outlet ports communicating with said passageway, (j) a normally closed valve in said passageway controlling the flow of lubricant therethrough, and
(k) a thermal responsive element subject to the temperature of the coolant in the cooling system operative to open said valve when the temperature of the coolant rises above a predetermined temperature,
(3) conduit means connecting the lubricant outlet port of said pressure actuated device to the lubricant inlet port of said temperature responsive device,
(4) conduit means connecting the lubricant outlet port of said temperature responsive device to the nonpressure side of the lubricating system, and
(5) means for restricting the flow of lubricant through the lubricant inlet port of said pressure actuated device, whereby opening of the valve in said temperature responsive device produces a drop in the pressure of the lubricant in the chamber of said pressure actuated device sufficient to enable closure of said fuel valve by said yieldable means.

9. Apparatus as claimed in claim 8 including
(6) manually operable means mounted in the chamber of said pressure actuated device for moving said piston in opposition to the force exerted by said yieldable means through a distance sufficient to effect opening of the fuel valve.

10. Apparatus for controlling the flow of fuel to an internal combustion engine in response to pressure and temperature conditions existing in a pressure lubricating system and a cooling system associated with the engine, comprising:
(1) a pressure actuated device including
  (a) a body a vertically extending fuel passageway therein,
  (b) fuel inlet and outlet ports communicating with said passageway at vertically spaced points therealong and connected to the fuel supply line of the engine,
  (c) a ball valve mounted in said passageway between said fuel inlet and outlet ports for controlling the flow of fuel therebetween,
  (d) a piston mounted for vertical movement in said body having an upper end portion adapted to engage and open said fuel valve when said piston is moved upwardly,
  (e) a piston head connected to the lower end of said piston and movable in a chamber in the lower part of said body,
  (f) means including a lubricant inlet port in said body for delivering lubricant to said chamber beneath said piston head from the pressure side of the lubricating system, whereby the pressure existing in said lubricating system may be exerted on said piston head in a direction such as to urge said piston upwardly to a position wherein the upper end portion thereof opens said fuel valve, and
  (g) yieldable means for moving said piston downwardly toward a position wherein the upper end portion thereof is out of engagement with said fuel valve and the valve is closed when the pressure of the lubricant in said chamber drops below a predetermined value,
(2) a temperature responsive device including
  (h) a body having a lubricant passageway therein,
  (i) lubricant inlet and outlet ports communicating with said passageway at spaced points therealong,
  (j) a normally closed ball valve in said passageway controlling the flow of lubricant therethrough,
  (k) a push rod mounted for axial movement in said body having one end portion normally spaced from but adapted to be moved into engagement with and open said lubricant valve when said push rod is moved in one direction, and
  (l) a thermal expansion element subject to the temperature of the coolant in the cooling system engaging the other end of said push rod and operative to move said push rod in the direction and through a sufficient distance to open said lubricant valve when the temperature of the coolant rises above a predetermined temperature,
(3) conduit means connecting the lubricant outlet port of said pressure actuated device to the lubricant inlet port of said temperature responsive device,
(4) conduit means connecting the lubricant outlet port of said temperature responsive device to the nonpressure side of the lubricating system, and
(5) a fitting in the lubricant inlet port of said pressure responsive device for restricting the flow of lubricant therethrough into said chamber, whereby opening of the valve in said temperature responsive device produces a drop in the pressure of the lubricant in the chamber of said pressure actuated device sufficient to enable closure of said fuel valve by said yieldable means.

11. Apparatus for controlling the flow of fuel to an internal combustion engine in response to pressure and temperature conditions existing in the pressure lubricating system of the engine and cooling systems associated with the engine and an accessory driven by the engine, comprising:
(1) a pressure actuated device including
  (a) a body having a fuel passageway therein,
  (b) fuel inlet and outlet ports communicating with said passageway and connected to the fuel supply line of the engine,
  (c) a fuel valve in said passageway controlling the flow of fuel between said inlet and outlet ports,
  (d) a piston movably mounted in a chamber in said body,
  (e) means including a lubricant inlet port in said body for delivering lubricant to said chamber from the pressure side of the lubricating system of said engine,
  (f) said piston having a portion adapted to engage and open said valve when said piston is moved in one direction by the pressure of the lubricant in said chamber, and
  (g) yieldable means for moving said piston in the opposite direction so as to permit the valve to close when the pressure of the lubricant in said chamber drops below a predetermined value,
(2) first and second temperature responsive devices each including
  (h) a body having a lubricant passageway therein,
  (i) lubricant inlet and outlet ports communicating with said passageway,
  (j) a normally closed valve in said passageway controlling the flow of lubricant therethrough,
  (k) said first temperature responsive device having a thermal responsive element subject to the temperature of the coolant in the cooling system of said engine operative to open the valve of said first device when the temperature of that coolant rises above a first predetermined temperature, and
  (l) the second temperature responsive device having a thermal responsive element subject to the temperature of the coolant in the cooling system of an accessory driven by said engine and operative to open the valve of said second device when the temperature of that coolant rises above a second predetermined temperature,
(3) conduit means connecting the lubricant inlet ports of said first and second temperature responsive devices in parallel to the lubricant outlet port of said pressure actuated device, (4) conduit means connecting the lubricant outlet ports of said first and second temperature responsive devices in parallel to the non-pressure side of the lubricating system of said engine, and (5) means for restricting the flow of lubricant through the lubricant inlet port of said pressure actuated device, whereby opening of the valve in either of said first and second temperature responsive devices produces a drop in the lubricant pressure in the chamber of said pressure actuated device sufficient to enable closure of said fuel valve by said yieldable means.

References Cited by the Examiner
UNITED STATES PATENTS

| | | | |
|---|---|---|---|
| 1,339,798 | 5/20 | Thompson | 123—198 |
| 1,473,303 | 11/23 | Lightford. | |
| 1,740,259 | 12/29 | Morrison | 123—119 |
| 2,112,664 | 3/38 | Dube | 123—41.15 |
| 2,201,123 | 5/40 | Davis | 123—198 |
| 2,306,903 | 12/42 | Ray | 137—94 |
| 2,580,866 | 6/52 | Waterman | 137—94 |
| 2,937,628 | 5/60 | Mayr | 123—41.15 |

KARL J. ALBRECHT, *Primary Examiner.*